(No Model.)  2 Sheets—Sheet. 1.
G. B. WIRGMAN.
PORTABLE FOLDING CANOPY.
No. 363,713. Patented May 24, 1887.
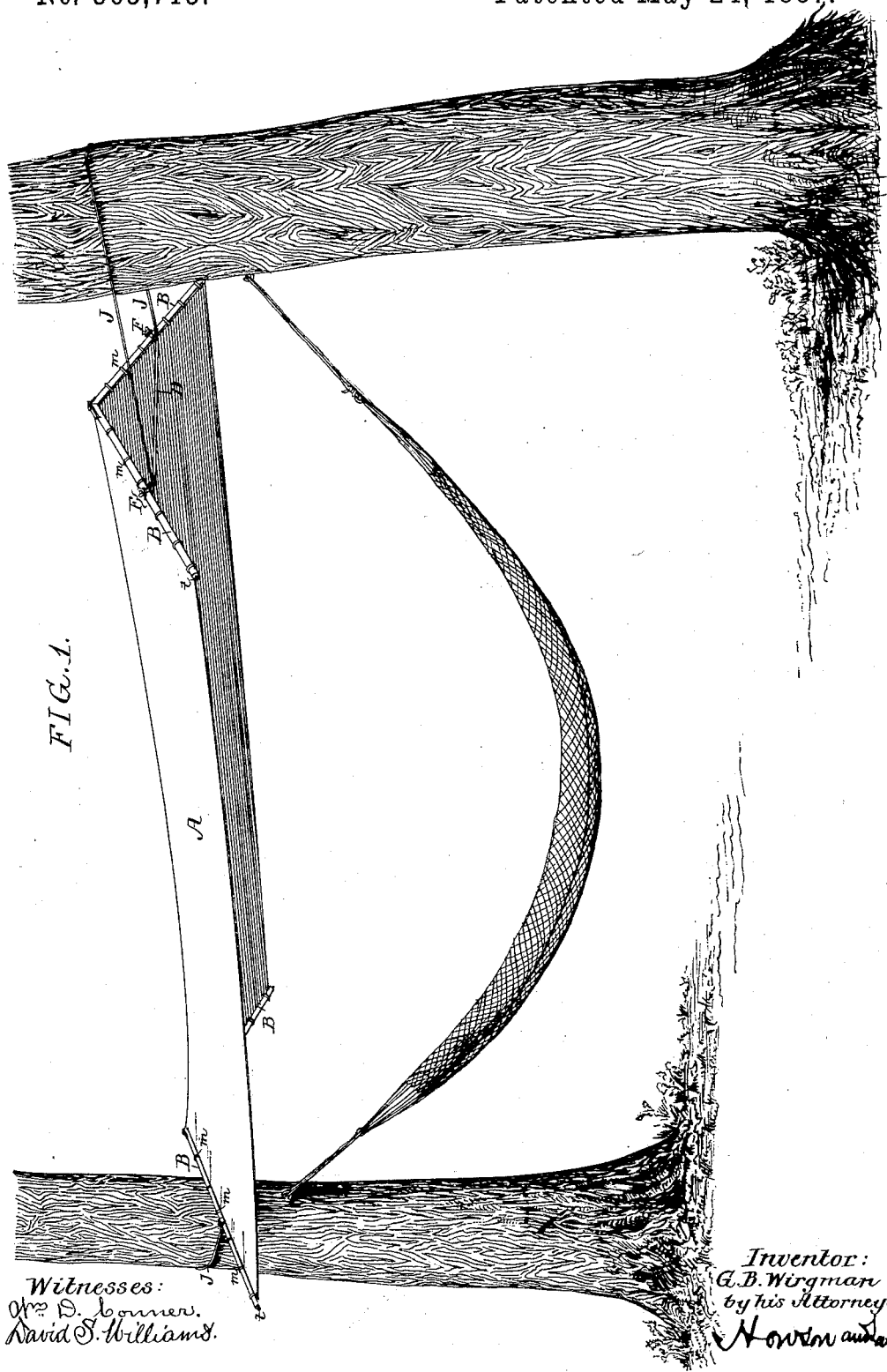

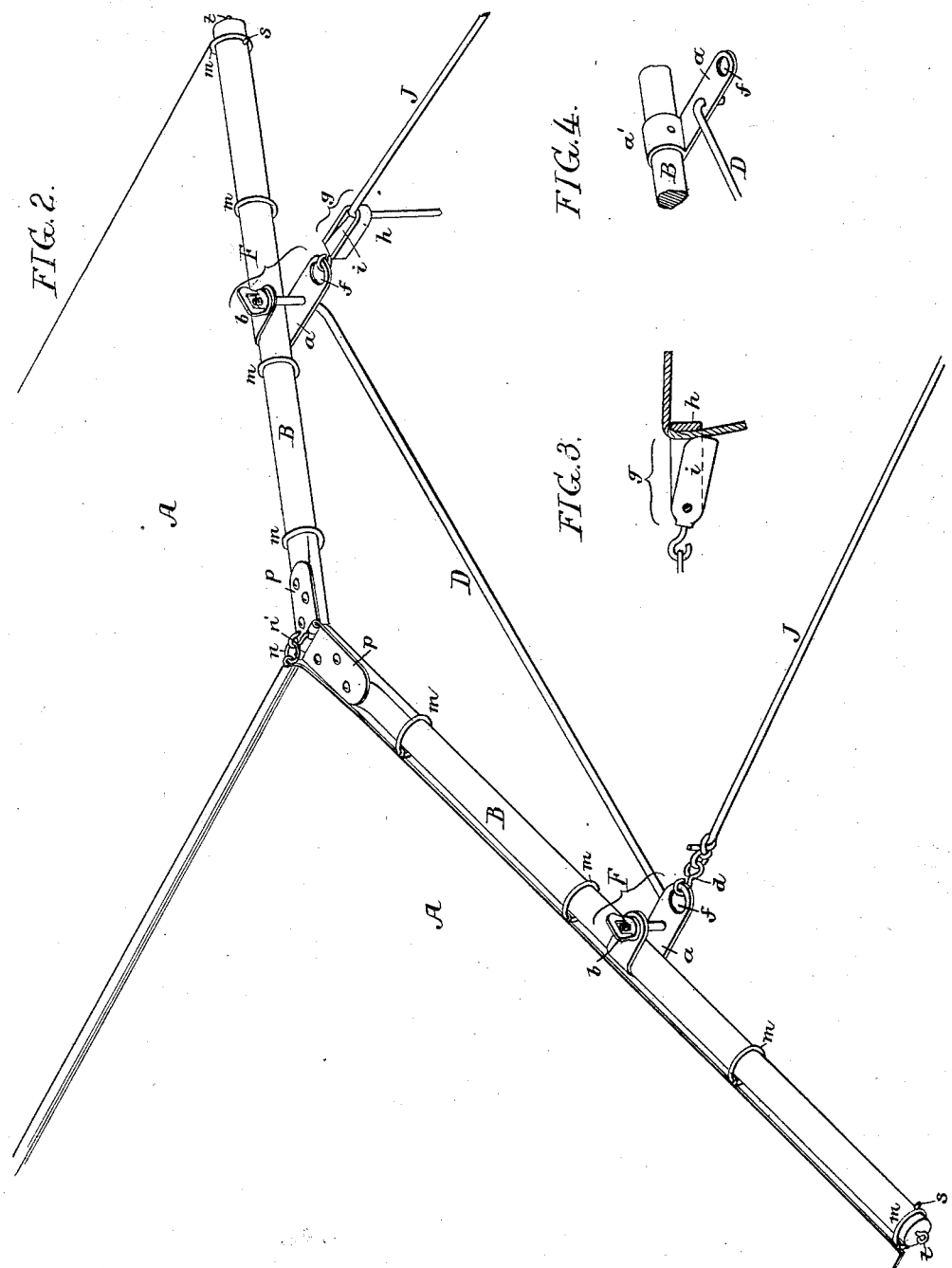
(No Model.) 2 Sheets—Sheet 2.
G. B. WIRGMAN.
PORTABLE FOLDING CANOPY.
No. 363,713. Patented May 24, 1887.

UNITED STATES PATENT OFFICE.

GRAFTON B. WIRGMAN, OF PHILADELPHIA, PENNSYLVANIA.

PORTABLE FOLDING CANOPY.

SPECIFICATION forming part of Letters Patent No. 363,713, dated May 24, 1887.

Application filed March 5, 1887. Serial No. 229,768. (No model.)

*To all whom it may concern:*

Be it known that I, GRAFTON B. WIRGMAN, a citizen of the United States, and a resident of Philadelphia, Pennsylvania, have invented certain Improvements in Portable Folding-Canopies, of which the following is a specification.

The object of my invention is to provide a canopy or awning which can be readily expanded and strung up into position, or can, with equal readiness, be taken down and folded into compact shape for transportation or storage; and this object I attain in the manner hereinafter set forth, reference being had to the accompanying drawings, in which—

Figure 1 is a view showing my improved awning or canopy in condition for use. Fig. 2 is a perspective view, on a larger scale, of one end of the canopy. Fig. 3 is a sectional view of a rope-retaining device which I prefer to use in connection with the stretching and spreading rope of the canopy, and Fig. 4 is a view showing a modification.

The awning A may be of any suitable material and of any desired shape or dimensions, and said awning is connected at each end to a frame comprising bars B B, hinged together at the center of the awning, the adjacent ends of the bars being beveled, so that said bars may be permitted to assume a position inclined in respect to each other, as shown in Figs. 1 and 2, the bars being rigidly held in this relation by means of a transverse stay rod or brace, D, connected to the bars at its opposite ends by means of clamps F. Each of these clamps preferably consists of a plate, $a$, bent so as to partially embrace the bar B and project beyond the same for the reception of the upwardly-bent end of the stay-rod, the upper end of the latter being threaded for the reception of a thumb-nut, $b$, on tightening which the clamp will be firmly secured to the bar B. The opposite ends of the awning being secured to the bars B, and the latter being drawn apart, the awning will assume the tent-like form shown in Fig. 1.

The frames at the opposite ends of the awning may be supported in any desired manner; but I prefer to provide the canopy at each end with a straining-rope, J, which can be passed around any available uprights for the purpose of stretching the awning and supporting the same and its frames at any desired distance above the ground. For instance, in Fig. 1 I have shown these straining-ropes passed around a couple of trees conveniently located, the canopy being stretched between these trees, which also serve to support the hammock swinging beneath the canopy.

One end of each straining-rope has a hook, $d$, adapted to an eye, $f$, in one of the clamps F, or it may be directly connected thereto; but the other end of the rope is adapted to a self-tightening hook or clasp, $g$, hung to the eye of the other clamp, the clasp consisting, in the present instance, of a loop, $h$, and hinged tongue $i$, between the end of which and the loop the rope is caught, the strain on the rope tending to constantly tighten the hold of the tongue thereon. Other forms of self-tightening retainers may, however, be used, and the retainer may be used with but one of the straining-ropes, if desired.

The awning A may, if desired, be permanently connected to the bars B; but I prefer to provide the awning at the ends with rings $m$, adapted to slip over the bars, and with a ring, $n$, adapted to a hook, $n'$, on the hinge $p$, which connects the bars, as by this means the awning can be readily applied to and removed from the bars. When the brace-rod D is in place, each end frame of the canopy is a rigid structure; but on removing said brace-rod the bars B can be folded together and the whole structure rolled into a compact bundle, the awning being detached from the bars or not, as desired.

In order to prevent the outer rings of the awning from slipping upon the bars B, each of the latter may be provided near each end with a projecting pin, $s$, to engage with such outer rings and retain them in position on the bars.

Although I prefer to use the clamps F shown and described, these are not essential to my invention. For instance, the bars may have rings or bands $a'$, with projecting plates $a^2$, for receiving the bent ends of the brace-rod D, as shown in Fig. 4. The outer ends of the bars B are preferably provided with eyes $t$, for the reception of guy-ropes, whereby the canopy may be properly stayed in windy weather.

I claim as my invention—

1. The combination of an awning with the end frames carrying the said awning, and each comprising two bars hinged together, and a transverse brace detachably connected to said bars, whereby, on the removal of the brace, the bars can be folded together, all substantially as specified.

2. The combination of the awning, the opposite end frames, the straining-ropes, and a self-tightening clasp carried by one of said frames and receiving and retaining an end of one of said straining-ropes, all substantially as specified.

3. The combination of the bars of the end frames, the hinge having a hook, and the awning having rings which receive the bars, the central ring being adapted to the hook of the hinge, all substantially as specified.

4. The combination, in the end frame of a canopy, of hinged bars, clamp-plates thereon, and a brace-rod having bent and threaded ends passing through the clamps and provided with tightening-nuts, all substantially as specified.

In testimony whereof I have signed my name to this specification in the presence of two subscribing witnesses.

GRAFTON B. WIRGMAN.

Witnesses:
LOUIS B. RANDALL,
O. W. SCHAEFFER.